US011873166B2

(12) United States Patent
Briano et al.

(10) Patent No.: US 11,873,166 B2
(45) Date of Patent: Jan. 16, 2024

(54) CLOSURE SYSTEM OF THE INTERCONNECTION OF TRANSPORT UNITS CONNECTED TO EACH OTHER IN A CONVOY

(71) Applicant: LEONARDO S.P.A., Rome (IT)

(72) Inventors: Andrea Briano, Pomezia (IT); Simone Castagno, Pomezia (IT); Giacomo Conti, Pomezia (IT); Andrea Parodi, Pomezia (IT)

(73) Assignee: LEONARDO S.P.A.

( * ) Notice: Subject to any disclaimer, the term of this patent is extended or adjusted under 35 U.S.C. 154(b) by 0 days.

(21) Appl. No.: 17/774,262

(22) PCT Filed: Nov. 6, 2020

(86) PCT No.: PCT/IB2020/060479

§ 371 (c)(1),
(2) Date: May 4, 2022

(87) PCT Pub. No.: WO2021/090268

PCT Pub. Date: May 14, 2021

(65) Prior Publication Data

US 2022/0388779 A1 Dec. 8, 2022

(30) Foreign Application Priority Data

Nov. 8, 2019 (EP) .................................... 19208067
Jan. 10, 2020 (IT) ........................ 102020000000310

(51) Int. Cl.
*B65G 17/06* (2006.01)
*F16C 29/08* (2006.01)
*B65G 17/34* (2006.01)

(52) U.S. Cl.
CPC .......... *B65G 17/068* (2013.01); *F16C 29/084* (2013.01); *B65G 17/345* (2013.01); *F16C 2326/58* (2013.01)

(58) Field of Classification Search
CPC .... B65G 17/068; B65G 47/66; B65G 17/345; F16C 29/084; F16C 2326/58
See application file for complete search history.

(56) References Cited

U.S. PATENT DOCUMENTS 5,224,584 A * 7/1993 Best .................... B65G 47/261 198/782
6,360,868 B1 * 3/2002 Arlt ..................... B65G 17/345 198/852

(Continued)

FOREIGN PATENT DOCUMENTS

DE 10238673 C1 12/2003
EA 003548 B1 6/2003

(Continued)

*Primary Examiner* — Mark A Deuble
(74) *Attorney, Agent, or Firm* — The Belles Group, P.C.

(57) ABSTRACT

Closure system for connecting two contiguous transport units in a convoy for the transport of goods, the closure system comprising an accordion-shaped element configured to change the length thereof along a longitudinal axis of the convoy and comprising a central portion and a pair of outer portions placed on opposite sides with respect to said axis, the thickness of the accordion-shaped element decreasing from the central portion to the outer portions.

12 Claims, 3 Drawing Sheets

Lmax 4 2 Lmax 4 2 2 4 4 2 2 Lmax 4 2 Lmin Lmin 4 2 L L A Lmin 2 1

(56) References Cited

U.S. PATENT DOCUMENTS

| | | | | |
|---|---|---|---|---|
| 9,233,803 | B2 * | 1/2016 | Pilarz | B65G 17/345 |
| 9,694,997 | B2 * | 7/2017 | Lopez | B60P 1/43 |
| 10,569,959 | B1 * | 2/2020 | Rodgers | B65G 47/96 |
| 10,934,096 | B1 * | 3/2021 | Schuyler | B65G 21/2054 |
| 2003/0221935 | A1 * | 12/2003 | Barklin | B65G 47/96<br>209/559 |
| 2017/0184176 | A1 * | 6/2017 | Close | B65G 17/22 |

FOREIGN PATENT DOCUMENTS

| | | | | |
|---|---|---|---|---|
| EP | 1810852 | A1 * | 7/2007 | B60D 5/003 |
| EP | 3205518 | A1 | 8/2017 | |
| GB | 698839 | A | 10/1953 | |
| WO | 2017025991 | A1 | 2/2017 | |

* cited by examiner 1
2
3
5a
5
4
B
5b
5b
2
3
A

CLOSURE SYSTEM OF THE INTERCONNECTION OF TRANSPORT UNITS CONNECTED TO EACH OTHER IN A CONVOY

CROSS-REFERENCE TO RELATED APPLICATIONS

This patent application is a U.S. national stage application under 35 U.S.C. § 371 of PCT application no. PCT/IB2020/060479, filed on Nov. 6, 2020, which claims priority from European patent application no. 19208067.9 filed on Nov. 8, 2019 and Italian patent application no. 102020000000310 filed on Jan. 10, 2020. The entire disclosure of the aforementioned priority applications are incorporated herein by reference in their entireties.

TECHNICAL FIELD

The present invention relates to a closure system, in particular to a closure system of the interconnection between transport units connected to each other in a convoy.

BACKGROUND OF THE INVENTION

The continuous expansion of the e-commerce market requires systems capable of managing shipments in a very wide dimensional range. This entails the need to use large transport systems that are able to safely transport even very small objects.

When in a system the transport function is carried out through single load units along a "train" path, during changes of direction, spaces of variable size and shape are created near the connections between the load units according to the curvature of the path.

The shape of the space varies in shape and size, for example between a rectangular shape (during the rectilinear motion of the transport system) with length equal to the length of the load unit and width equivalent to the physical distance between two contiguous load units) and a "V" shape (in the curvilinear sections).

In this case, the amplitude angle depends on the curvature radius of the transport train, the maximum distance between the single load units depends on the curvature angle and radius, on the size of the units, on the distance between the units in the point of minimum distance and the minimum distance depends on the curvature radius, on the size of the units (there is, in fact, a minimum space to be ensured to prevent contact of the corners inside the curve between two consecutive modules) and on the closure system between the units used.

During transport, for various reasons, the transported object or part thereof may find itself in this space due to possible failures or positioning errors during loading, to the instability of the object itself during transport/loading or to the loss of part of the contents thereof. Again, ropes or other connection elements could be found in this space.

In the absence of adequate closure of the spaces between load units, the anomalies described above can result in interlockings with even serious damage to the transport system and/or to the transported object.

It is therefore necessary to provide for closure systems, configured to change their shape according to the shape assumed by the convoy and thus prevent the dangerous interposition of goods/objects between the transport units.

Currently, the solutions on the market generally consist of partially overlapping rigid "flaps" that do not adequately solve the problem, since they leave spaces at their ends that allow the intrusion of objects towards the underlying mechanics of the system with a consequent high risk of interlocking.

In rare cases, complex "accordion" structures have been conceived, which in the curved parts of the path occupy significant spaces, consequently forcing wider curvature radii of the system. The complexity of these objects requires high production costs and high installation times.

The need is therefore felt to prevent the interlocking of even small-sized objects between contiguous transport units, allowing at the same time to create transport and distribution paths with curvature radii as small as possible.

Examples of known systems of the art which however suffer from the above problems are illustrated in documents EP3 205518, WO2017/025991, EA003548, GB698839 or DE10238673

In particular, the need is felt to solve the aforementioned technical problem in an economical and optimized way.

SUMMARY OF THE INVENTION

The above problems are solved by a closure system for closing the space between contiguous transport units connected with each other as claimed in the attached claims.

Thanks to the claimed closure system, a single element allows, thanks to the variable thickness which is reduced at the ends, to limit the space occupied in the phase of maximum compression in the curved parts of the path of the transport system.

In this way, a complete coverage of the spaces between the load units is guaranteed, eliminating the potential points of interlocking and allowing the minimum curvature radius in the path of the transport system.

BRIEF DESCRIPTION OF THE DRAWINGS

Further features and advantages of the present invention will become apparent from the detailed description that follows, provided by way of non-limiting example with reference to the accompanying drawings, wherein.

DETAILED DESCRIPTION OF THE INVENTION

Reference 1 generally indicates a convoy comprising a plurality of transport units 2 connected with each other. In particular, the transport units 2 can be of any shape and configured for the transport of objects of any shape and size.

Figure 2:
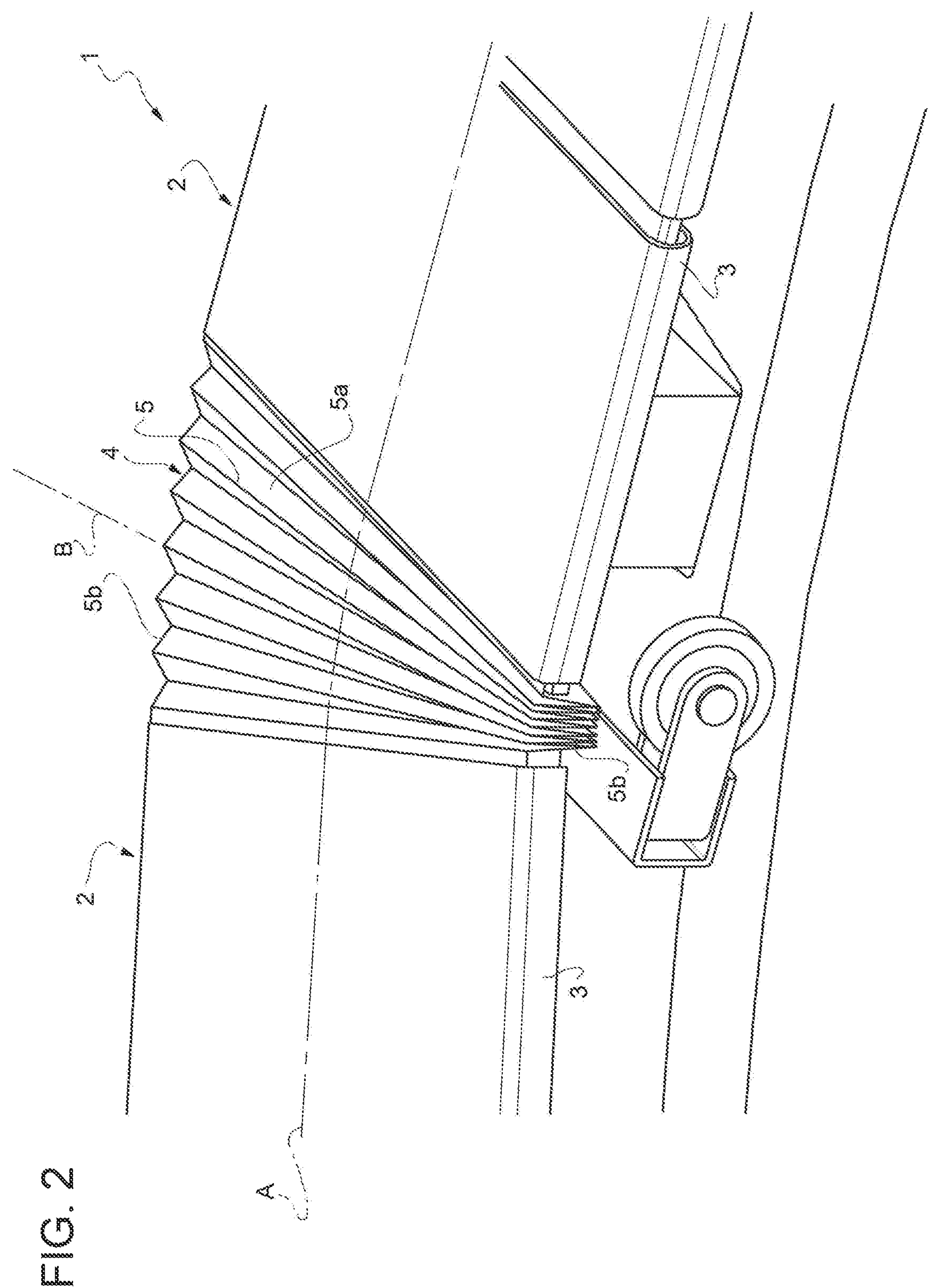
FIG. 2 is a perspective view illustrating a portion of the convoy of FIG. 1.

For this purpose, the transport units 2 comprise, like for example illustrated in FIG. 2, a wall 3 defining a support surface configured to allow housing objects to be transported.

The transport units 2 are connected with each other to define a convoy through connection means, known and not illustrated, so as to define a gap between a transport unit 2 and the contiguous ones.

Figure 1:
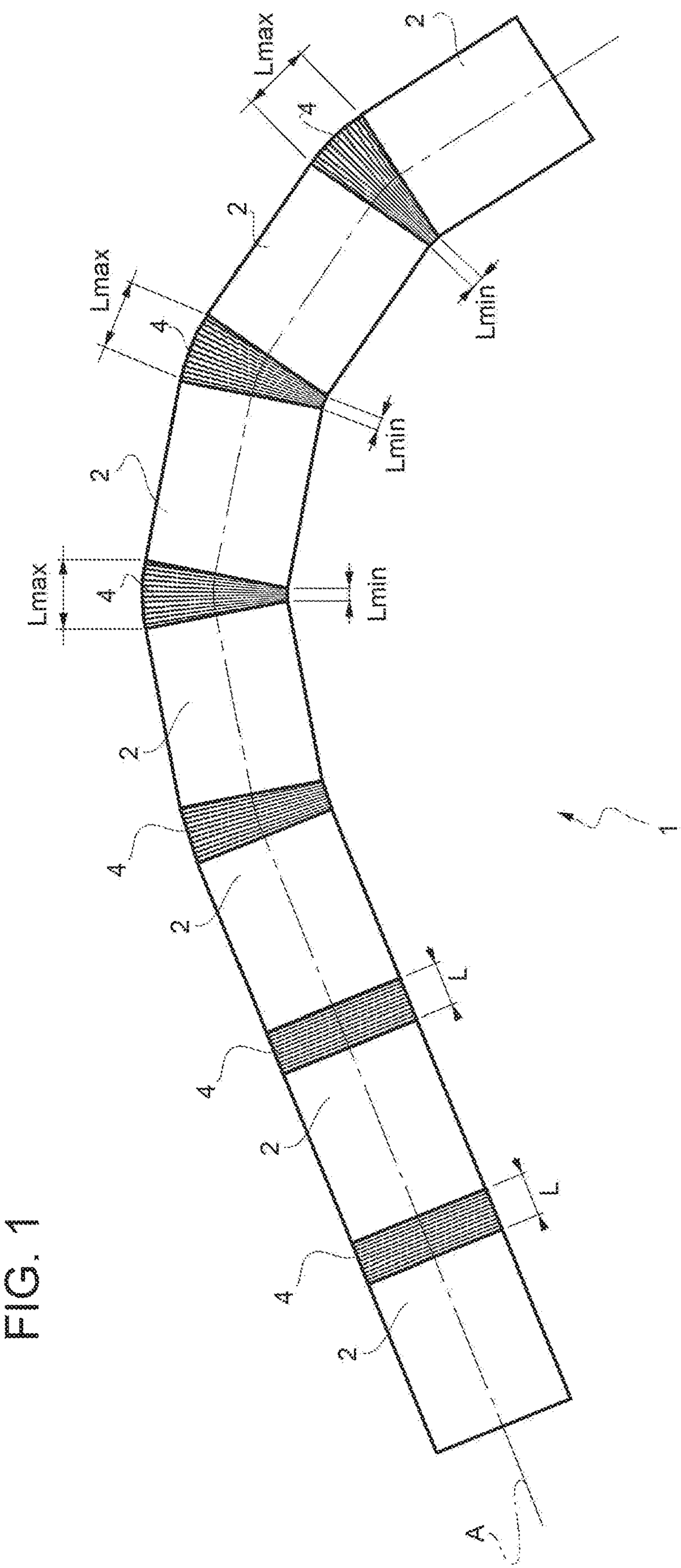
FIG. 1 is a schematic top view illustrating a convoy of transport units connected with each other and provided with a closure system for closing the space between two contiguous vehicles according to the invention.

With reference to FIG. 1, this gap has a size along a longitudinal axis A of the convoy equal to L; however this size can vary according to the path of the convoy 1 itself between a minimum dimension $L_{min}$ and a maximum dimension $L_{max}$ due to the curvature radius of the path followed by the convoy 1.

The gap between each transport unit 2 and the contiguous ones is bridged by a respective closure system 4 configured to prevent an object from interposing between two transport units 2 or from coming off through it.

The closure system 4 is substantially elastic and can compress until the aforementioned minimum gap $L_{min}$ is defined between two transport units 2 or expand to define the aforementioned maximum gap $L_{max}$ between two transport units 2. As clearly visible in FIG. 2, such minimum and maximum gaps are reached at the transverse ends of the closure system 4 with respect to the longitudinal axis A of the convoy 1.

According to the invention, the closure system 4 comprises an accordion-shaped element 5 configured to expand or compress according to the force applied to the latter along a longitudinal axis, in the described case longitudinal one A, and provided with a variable thickness along a further axis perpendicular to the first, in the case described, a transverse axis B perpendicular to the longitudinal axis A of the convoy 1.

Figure 3:
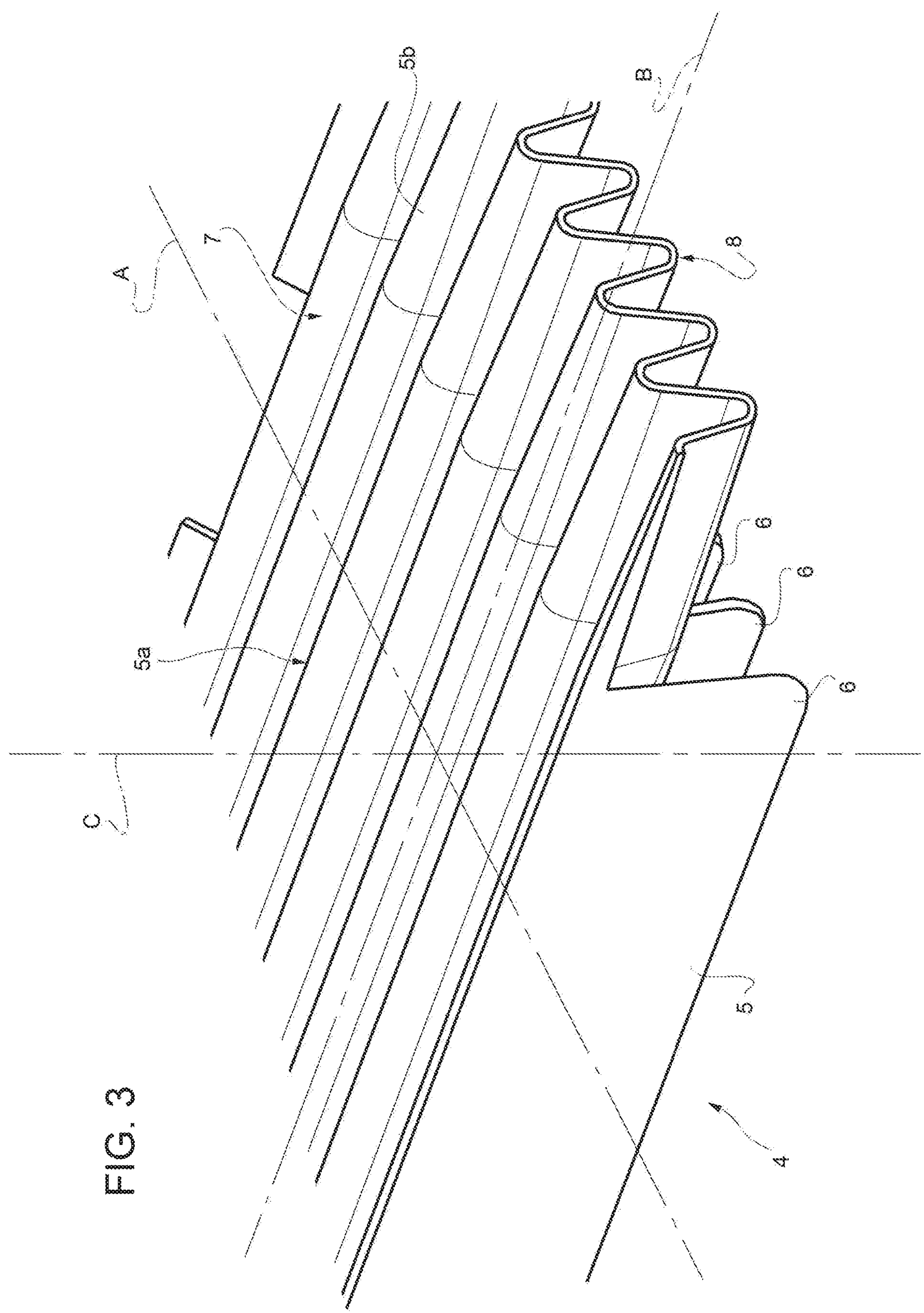
FIG. 3 is an enlarged perspective view illustrating a portion of the closure system according to the invention.

In greater detail, with reference to FIG. 3, the thickness varies between a maximum value in a central portion 5*a* of the accordion-shaped element 5 to a minimum thickness in outer portions 5*b* of the accordion-shaped element 5, opposite each other with respect to the longitudinal axis A.

Advantageously, the accordion-shaped element 5 is made in a single piece, preferably of elastic material, for example a polymeric material such as a rubber, even better SBR rubber. Advantageously, the closure system 4 is also substantially planar in shape, i.e. the extension along the axes A and B is much greater than the extension along the remaining axis.

According to the exemplary embodiment described in the present application, illustrated in FIG. 3, the central portion 5*a* of the accordion-shaped element 5 defines a first corrugated profile 7 and the outer portions each define a respective corrugated profile 8.

It is specified that the expression "corrugated profile" defines a profile having a shape provided with an amplitude of extension along a periodically repetitive first direction along a second direction and not necessarily a shape of the curved or sinusoidal type.

Advantageously, said corrugated profiles 7, 8 are continuous between one another and have a pitch and a variable amplitude according to the type and size of the transport units 2 to be connected with each other.

In particular, according to the embodiment described, the corrugated profiles 7, 8 define their pitch along the longitudinal axis A, they extend transversely along the axis B until they cover at least the entire width of the respective walls 3 of the transport units 2 to which they are connected and have an amplitude along a vertical axis C perpendicular to the axes A and B.

In the exemplary embodiment described in FIG. 3, the corrugated profiles 7, 8 define curved terminal vertical portions and intermediate portions connecting said substantially flat vertical terminal portions. In the exemplary embodiment of FIG. 2, the curved terminal portions are extremely small and the corrugated portion is substantially defined by the intermediate flat portions, thus defining a corrugated portion substantially triangular along the axis A.

In addition, the accordion-shaped element 5 may comprise a plurality of flanges 6 extending along the vertical axis C.

More particularly, the plurality of flanges 6 is carried by the central portion 5*a* and is therefore connected to the corrugated profile, for example in the intermediate flat portion. Even more preferably, all the flanges 6 extend along the axis C from one of the accordion system 5.

Advantageously, the terminal flanges 6 along the axis A can be configured to be fixed to the respective transport units 2; for example they can be provided with holes or projections (not shown) to allow them to be fixed to the transport units 2.

According to the principle underlying the invention, the corrugated portion 8 of the outer portions 5*b* has a smaller thickness than the corrugated portion 7 of the central portion 5*a*. According to the embodiment described above, the corrugated portion 7 and the corrugated portion 8 are therefore joined together to compensate for this difference in thickness.

Preferably the corrugated portion 8 is tapered starting from the central portion 5*a* up to the transversely outermost portion of the end portion 5*b*. Advantageously, this tapering follows a linear law.

The operation of the closure system 4 according to the invention is as follows, with reference to FIGS. 1 and 2.

In a linear path condition, the closure system 4 is in a rest condition and connects two contiguous transport units 2 without changing its shape.

In a curved path condition the closure system 4 changes its shape to follow the trajectory of the convoy 1. Consequently, the portion that is the closest to the centre of the curvature radius tends to compress while the portion that is the farthest from the latter tends to expand.

From the above, the advantages of a closure system 4 according to the invention are evident.

In particular, it is possible to minimize the angle of curvature that can be followed by the convoy 1, reducing the development thereof and therefore with lower costs. In particular, it is possible to obtain curvature radii of the order of 2, 2.5 meters depending on the standard sizes of the transport units 2.

By reducing the development of the convoy 1, the latter occupies a smaller plan area and therefore can also be used in environments with reduced useful surfaces.

The fact that the closure system 4 uses a system made in a single piece, by moulding and preferably of a single material, allows to minimize production costs and times thereof. In addition, it facilitates installation, maintenance and replacement thereof between two transport units 2. Again, metal elements are totally absent.

Furthermore, the proposed system avoids objects from getting interlocked/falling in the area between two contiguous transport units 2.

Finally, it is clear that the advantages of a closure system 4 according to the present invention can be made with modifications and variations which, however, do not depart from the scope of protection defined by the claims.

For example, it is clear that the indicated embodiment can be realized differently from that illustrated in the drawings and described above in detail.

For example, as mentioned, the corrugated profiles 7, 8 could vary their shape or the thickness reduction in the outer portions 5*b* could be different or, again, the shaped profiles 7, 8 could have different pitch and amplitudes between central portion 5*a* and outer portions 5*b*.

Furthermore, some elements may be optional or replaceable by functional equivalents within the limits of the claims reported below, such as for example in the case of the flanges 6.

The invention claimed is:

1. A closure system for connecting two contiguous transport units in a convoy for the transport of goods, said closure system comprising an accordion-shaped element configured to change a length of the accordion-shaped element along a longitudinal axis of said convoy, the accordion-shaped element vertically extending along a vertical axis and transversally extending along a transversal axis, said vertical axis and said transversal axis being perpendicular to said longitudinal axis, characterized in that the accordion-shaped element comprises a central portion and a pair of outer portions placed on opposite sides with respect to said axis, a thickness of said outer portions on a plane defined by said longitudinal and vertical axis decreasing from said central portion to said outer portions along said transversal axis.

2. The closure system according to claim 1, wherein the thickness of said outer portions linearly decreases starting from the respective connection with said central portion until reaching a minimum value at the end of said outer portions.

3. The closure system according to claim 1, wherein said central portion and said outer portions each comprise a corrugated profile.

4. The closure system according to claim 3, wherein said corrugated profiles comprise curved axial end portions and flat intermediate portions.

5. The closure system according to claim 3, wherein the corrugated profile of said central portion and the corrugated profile of said outer portions are continuous between one another.

6. The closure system according to claim 3, wherein said corrugated profiles each define corrugations defining a pitch along said longitudinal axis.

7. The closure system according to claim 1, wherein said central portion comprises a plurality of flanges, said flanges being carried by said corrugated profile.

8. The closure system according to claim 7, wherein said flanges are carried by said corrugated profile so that they are all arranged on a same side of the latter.

9. The closure system according to claim 1, wherein said accordion system is made in a single piece.

10. The system according to claim 1, wherein said accordion system is moulded.

11. The system according to claim 1, wherein said accordion system is made of rubber.

12. A convoy comprising a plurality of transport units connected with each other, said convoy comprising a closure system according to claim 1, said closure system being interposed between two transport units contiguous to one another.

* * * * *